United States Patent [19]

Yellowley et al.

[11] Patent Number: 5,000,036
[45] Date of Patent: Mar. 19, 1991

[54] TOOL WEAR DETECTOR

[75] Inventors: Ian Yellowley, West Vancouver; Yetvart Hosepyan, Vancouver, both of Canada

[73] Assignee: The University of British Columbia, Canada

[21] Appl. No.: 497,886

[22] Filed: Mar. 23, 1990

[51] Int. Cl.$^5$ .............................................. B23Q 17/09
[52] U.S. Cl. ...................................................... 73/104
[58] Field of Search ................. 73/7, 104; 374/45, 57, 374/46, 51; 340/680, 590, 588, 589

[56] References Cited

U.S. PATENT DOCUMENTS

| 4,757,307 | 7/1988 | Keramati et al. | 73/104 |
| 4,818,153 | 4/1989 | Strandell et al. | 73/104 |

FOREIGN PATENT DOCUMENTS 0247071  6/1987  Fed. Rep. of Germany ........ 73/104

OTHER PUBLICATIONS

A Study on a Throw Away Tool Equipped with a Sensor to Detect Flank Wear—Aoyama et al., Bul. of Japan Society for Precision Eng., vol. 21, No. 3, Sep. 1987.

Some Observations on the Accelerated Ageing of Thick Film Resistors, Proceedings European Hybrid Microelectronics Conference, 1979—Sinnadurai et al.

A.S.M.E., Journal of Engineering for Industry, vol. 85 (1963), p. 33.

*Primary Examiner*—Robert Raevis
*Attorney, Agent, or Firm*—C. A. Rowley

[57] ABSTRACT

A tool wear detector is formed by applying a resistor, the resistance of which is permanently altered in accordance with a time/temperature relationship (and by change in size e.g. as a result of wear), to a tool in a manner so that the resistor and the portion of the tool to be monitored are subjected to corresponding temperature cycles. Measuring the resistance of the resistor at any time provides an indication of the cutting conditions to which the monitored portion of the tool has been subjected and thereby an indication of the remaining life of the portion of the cutting edge of the tool being monitored.

17 Claims, 2 Drawing Sheets

TOOL WEAR DETECTOR

FIELD OF THE INVENTION

The present invention relates to detection of tool wear. More particularly the present invention relates to detection of the degree of wear of a cutting tool based on the thermal/time history to which it has been subjected in the major areas of wear.

BACKGROUND OF THE PRESENT INVENTION

In tool management, particularly in throw-away type cutting tools, it is desirable to have each edge of the tool monitored by a sensor that would detect tool wear or remaining tool life.

Various proposals have been made to measure tool wear by incorporating resistances for example onto the flank face of a cutting tool and monitoring the resistance of such resistors. A good summary of known system is provided in the paper entitled 'A Study on Throw-Away Tool Equipped with a Sensor to Detect Flank Wear' by Aoyama et al. in the Bulletin of the Japan Society for Precision Engineering, Volume 21, No. 3, Sept. 1987, pages 203-208.

The various sensors described in this paper are thin film resistors that are applied to the flank face of a tool. The authors propose a different form of resistor that can be operated independent of the work piece, i.e. the work piece does not form part of the circuit to the resistor so that the resistance may be measured both on and off the machine.

All of the systems disclosed in the Aoyama et al. paper obtain a change in resistance of the incorporated resistor only by abrasion, i.e. the size of the conducting path is changed by removal of some of the resistor during the cutting operation of the tool thereby to provide a permanent record of the wear to which the tool has been subjected. In all of the systems with the exception of the one proposed by the authors of the paper, resistance can only be measured or the estimate of tool wear can only be made when the tool is in operation and the element to be cut is in position as the element forms part of the electric circuit necessary to measure the resistance.

Thick film resistors are well-known and it has been found that certain problems are encountered with the accuracy of the resistances changing over time when subjected to high temperature, thermal stress or high moisture conditions. This characteristic of certain thick film resistors was investigated and reported in a paper given in the proceedings European Hybrid Micro-Electronics Conference in 1979 entitled 'Some Observations on the Accelerated Aging of Thick Film Resistors' by Sinnadurai et al. It was found that the resistance of certain thick films changed permanently when subjected to elevated temperatures over periods of time or to other conditions such as high humidity condition and that the degree of change in resistance or manner in which the resistance of the various thick films were changed was dependent on the ink used, resistor value (i.e. high or low resistance) and the manner in which the resistor was encapsulated.

It is also well known that the higher the tool temperature the faster the wear rate and thus the shorter the tool's life expectancy (see trans. A.S.M.E. Journal of Engineering for Industry Vol. 85 (1963) page 33.)

BRIEF DESCRIPTION OF THE PRESENT INVENTION

It is an object of the present invention to provide a wear indicator for a tool, particularly a disposal tool.

Broadly the present invention relates to a cutting tool comprising a tool body having a cutting edge defined by an intersection of a flank face and a rake face of said tool body, a resistor the resistance of which is permanently altered in proportion to a time/temperature relationship to which it is subjected secured in thermal conducting relationship to said tool body so that said resistor is subjected to temperatures proportional to the tool temperature in a selected area of the tool at any given time whereby thermal stresses are applied to said resistor are in proportion to the time/temperature conditions to which said selected area of said tool has been subjected.

Preferably said resistor will be a thick film type resistor. More preferably the thick film resistor will be applied to the tool body with the majority of a conducting phase of said thick film resistor adjacent to an interface with said tool body.

Preferably said resistor will be applied to a flank face of said tool body and more preferably said resistor will be a straight line resistor having one edge substantially parallel to said cutting edge defined by said flank face to which said resistor is applied.

Preferably said resistor will extend around a corner defined by a pair of adjacent flank faces of said tool.

Preferably said resistor will be positioned adjacent said flank face to which it is applied and will be encapsulated in a protective coating.

It is also possible to embed the resistor in the rake face of said tool.

Preferably the resistor will be positioned adjacent to said cutting edge in a position to be subject to wear when said edge wears a selected amount to reduce the conducting path of said resistor and thereby increase the resistance of said resistor to indicate wear at said cutting edge.

The present invention also relates broadly to a method of measuring the remaining wear life of a tool comprising applying a resistor, the resistance of which is permanently altered in proportion to a time/temperature relationship in thermal conducting relationship to said tool bit and monitoring the resistance of said resistor over a time to provide an indication of the thermal stress to which said tool has been subjected and thereby provide an indication of the remaining wear left in said tool.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
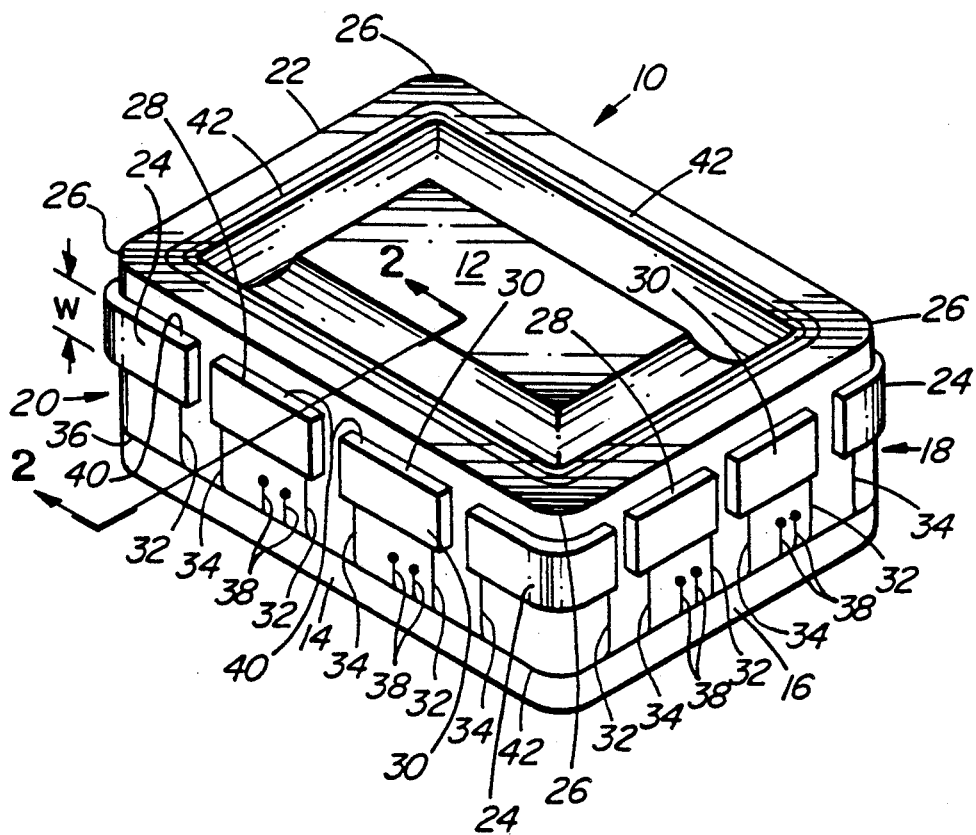
FIG. 1 is an isometric illustration of a cutting tool equipped with a monitoring resistor of the present invention.

The tool 10 shown in FIG. 1 has a rake face 12 and a plurality of flank faces 14, 16, 18 and 20 and has a cutting edge 22 defined by the intersection of the rake face 12 with the various flank faces 14, 16, 18 and 20. Generally the tool will be made of material that does not distribute the heat generated by cutting uniformly rather the temperature of the tool immediately adjacent the portion of the cutting edge doing the cutting is generally significantly higher than the average temperature of the tool body.

A corner thick film resistor 24 extends around each of the corners 26 defined by the intersections of pairs of adjacent faces 14, 16, 18 and 20 and is mounted on the faces 14, 16, 18 or 20. Preferably a pair of discrete thick film resistors 28 and 30 will be mounted on each of the faces 14, 16, 18 and 20 between the end of the corner resistors 24 applied to each of the faces.

Figure 3:
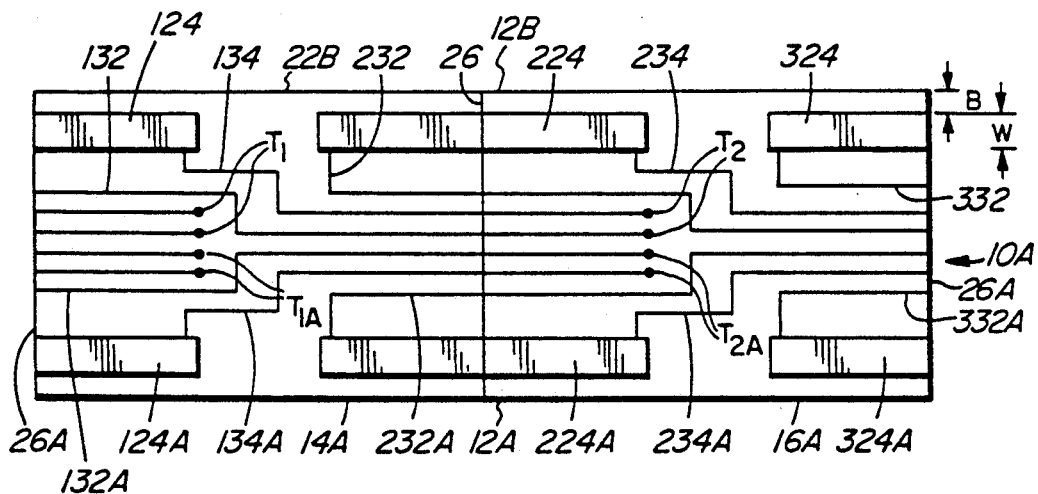
FIG. 3 is a side elevation view of a double edged tool with corner monitoring resistors for each of the cutting edges.

Each of the resistors 24, 28 and 30 is connected via conductors 32 and 34 to a conductor system 36 that separately connects each resistor 24, 28 and 30 to its respective terminals 38 on a face 14, 16, 18 or 20 other than the face on which the resistor is mounted (see FIG. 3 for a typical wiring arrangement). The corner resistors 24 each have both their conductors 32 and 34 connected to terminals on the same face 14, 16, 18 or 20 eg. the corner resistor 24 extending around the corner formed at the intersection of the faces 14 and 20 (selected resistor 24) may be connected to their respective terminals on face 16. Similarly the other resistor(s) 28 and 30 to be monitored at the same time as the selected resistor 24 will have their terminals 38 on the same face 16 as the terminals 38 for the selected resistor 24. Connecting the resistors to terminals 38 on an adjacent flank face facilitates connecting the resistors to a monitoring system when the tool is mounted in cutting position on the machine.

The resistors 24, 28 and 30 are preferably positioned with their upper edges 40, i.e. the edge 40 adjacent to and substantially parallel to the adjacent portion of the cutting edge 22 of the tool. By so placing each of the edges 40 the resistors 24, 28 or 30 may be subjected to wear as the tool is worn to reduce the width w of the resistor 24, 28 or 30 which increases the resistance of the resistor by reducing the width of the conducting path which, as will be apparent, is dependent on the width and thickness of the thick film resistor 24.

The thick film resistor 24 is preferably a substantially uniform thickness, uniform width conducting strip extending in a straight line along the flank face of the cutter such as flank faces 14, 16 as illustrated in FIG. 1 (or equivalent faces 14A and 16A of FIG. 3.) Generally the resistors 24, 28 and 30 (or 124, 224, 324, 124A, 224A and 324A of FIG. 3) will have a width w=200 to 400 microns, a thickness of 10 to 20 microns and will be spaced from the cutting edge 22 (or 22A or 22B of FIG. 3) by about 400 to 800 microns.

Figure 2:
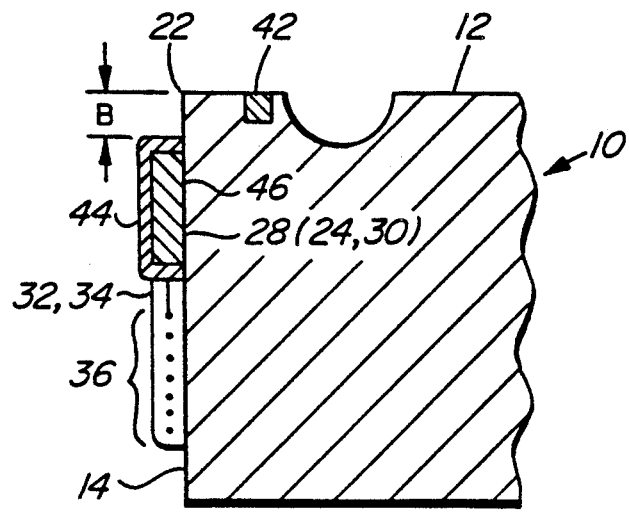
FIG. 2 is a section along the line 2—2 of FIG. 1 showing a thick film resistor mounted on a flank face and encapsulated in a protective coating (and a resistor embedded on the rake face.)

In some cases it may be desirable to apply the resistor to the rake face 12. In this case it is preferred to embed the resistor into the face of the tool so that the resistor will not project above the face (see the resistor 42 of FIG. 2 as shown in dotted lines in FIG. 1). Obviously the resistor 42 will be connected to suitable terminals not shown for measuring the resistance.

Also the resistors 24, 28 and 30 could be embedded in the same manner as the resistor 42 but in the flank faces, however it is preferred to print the thick film resistors directly on the surface of the flank faces and then encapsulate them in a suitable dielectric layer 44 applied by printing and then firing. The conductors 32 and 34 and the cable 36 are similarly applied and encapsulated. The encapsulating material will normally be a glass material suitably loaded as desired.

The resistors and their encapsulating layers may be applied to the faces 14, 16, 18 and 20 for example by screen printing.

Obviously care must be taken in printing to ensure proper adhesion of the ink forming the thick film resistor to the face of the tool. This may require ceramic coatings on the tool or certain modifications of the binding system used to apply and secure the ink in position. The latter is most important when the tool is made from cemented carbide or high speed steel.

Preferably the ink used to form the thick film resistor 24 will be formulated to insure that the conducting phase of the resistor migrates to the interface between the resistor and the tool body as so locating the conducting portion 46 of the resistor (see FIG. 2) will better protect the resistor from abrasive wear.

It is also preferred to protect the thick film resistor 24 by a suitable encasing material 44 (see FIG. 2) that as above described can be applied and printed directly over the resistor 24 and then fired.

It is important that the thick film resistor have the required properties, namely that when subjected to elevated temperatures (in the order of 300°-500° C.) the resistance of the resistor change significantly over time and that these changes be permanent changes so that the resistance of the resistor 24 may be measured at any time either on or off of the machine to determine the amount of thermal stress to which the tool 10 has been subjected thereby to provide an indication of the wear left in the tool.

Referring to FIG. 3 a double sided tool 10A having two rake faces 12A and 12B which define at their intersections with flank faces 14A, 16A (and 18A and 20A not shown) cutting edges 22A and 22B respectively. Corner resistors 124 and 124A (similar to resistor 24 of FIG. 1) extend around the left most corner 26A adjacent the edges 22B and 22A respectively while similar resistors 224 and 224A extend around the central corner 26A and resistors 324 and 324A extend around the right hand corner 26A adjacent the edges 22B and 22A respectively of the tool 10A. Each of the resistors 124, 224, 324, 124A, 224A and 324A are connected to their monitoring terminals T equivalent to the terminals 38 of FIG. 1 in the same manner. For example, the resistor 124 is connected via lines 132 and 134 extending across the face 14A to terminals $T_2$ located around the central corner 26A and on face 16A. The resistor 124A is similarly connected to terminals $T_{24}$ on face 16A by lines 132A and 134A. The resistors 224 and 224A are connected via lines 232, 234 and 232A and 234A respectively with terminals (on face 18A not shown), resistor 324 and 324A to further terminals (on face 20A not shown) and the resistors wrapping the corner of the tool 10A opposite the central corner 26A is connected to terminals $T_1$ and $T_{14}$.

To monitor a selected portion of the cutting edge 22 (22A or 22B) the resistance of the adjacent resistor is measured by connecting to terminals 38 (or T) either when the tool is in use on the machine or when the tool is removed from the machine.

Figure 4:
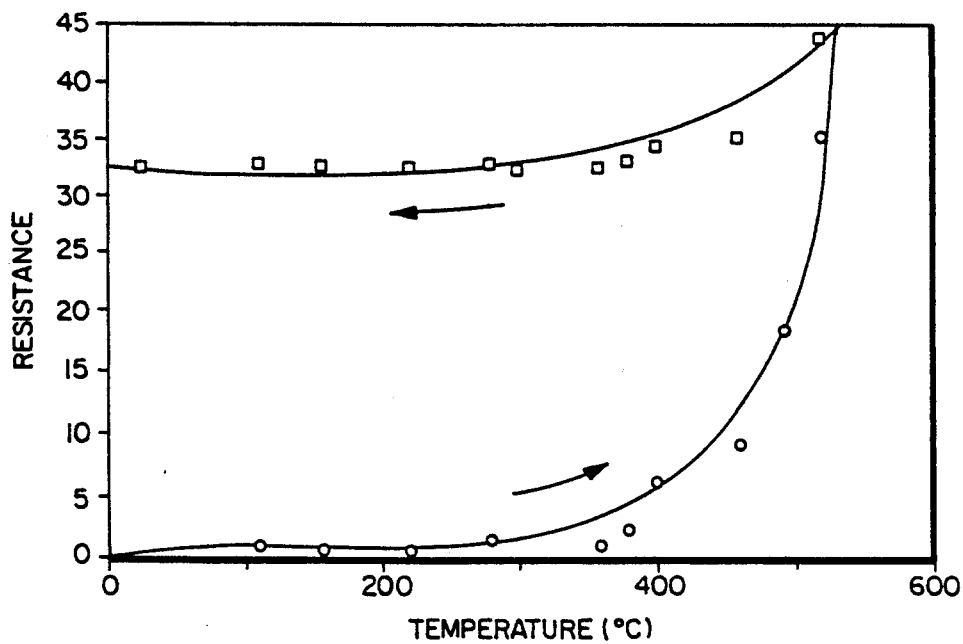
FIG. 4 is a curve of temperature versus resistance of a resistor suitable for use with the present invention.

FIG. 4 shows a typical curve of a resistance versus temperature. The O's indicate increasing temperature and the boxes indicate decreasing temperatures. Thus it will be apparent that when the resistor has been subjected to a significant temperature (450° C. in the illustration) that the resistance has changed significantly so that if the resistance is measured at any time either in use or after cooling, it will provide a very clear indication of the amount of thermal stress to which the tool has been subjected and thereby an indication of the wear left in the tool.

Obviously the composition of the thick film resistor will be properly selected for the temperature conditions it will be required to monitor.

In use, the resistor 24, 124, 124A, 224, 224A etc., at the cutting corner is monitored to determine wear etc. The resistors 28 and 30 are not essential but when present it is preferred to monitor the resistors 28 and 30 on opposites sides of the corner resistor 24 being measured (for example if selected corner resistor 24 is the one on the left in FIG. 1, the resistor 28 on face 14 and resistor 30 on face 20 (not shown) would be monitored). It is also practical to monitor the resistor 30 on face 14 at the same time or monitor only resistors 28 and 30 on face 14 and not resistor 30 on face 20 (assuming face 14 is the leading face.)

As the tool edge 22 or 22A or 22B wears the heat generated by the cutting action of the tool increases thereby subjecting the adjacent resistor to the higher temperature which will accelerate the deterioration of the resistor (increase in resistance of the resistor) and thus the indication of the degree of wear of the cutting edge being monitored will be increased.

Having described the invention, modifications will be evident to those skilled in the art without departing from the spirit of the invention as defined in the appended claims.

We claim:

1. A tool comprising a tool body having a cutting edge defined by an intersection of a flank face and a rake face of said tool body, a resistor, the resistance of which is permanently altered in proportion to the time at which said resistor is subjected to elevated temperatures and the elevated temperatures to which said resistor is subjected secured in thermal conducting relationship to said tool body so that said resistor at any given time is subjected to elevated temperatures proportional to elevated tool temperatures of the adjacent portion of the cutting edge to be monitored whereby thermal stresses are applied to said resistor in proportion to the time said portion was at said elevated tool temperatures and the elevated temperature conditions to which said portion of said cutting edge was subjected.

2. A tool as defined in claim 1 wherein said resistor is a thick film type resistor.

3. A tool as defined in claim 2 wherein said resistor is applied to a flank face of said tool body.

4. A tool as defined in claim 3, wherein said resistor is a straight line resistor having one edge substantially parallel to said cutting edge defined by said flank face to which said resistor is applied.

5. A tool as defined in claim 3 wherein said resistor is a straight line resistor having one edge substantially parallel to said cutting edge defined by said flank face to which said resistor is applied.

6. A tool as defined in claim 2 wherein said resistor is embedded in a selected face of said tool.

7. A tool as defined in claim 2 wherein said thick film resistor is applied to said tool body with the majority of a conducting phase of said thick film resistor adjacent to an interface of said resistor with said tool body.

8. A tool as defined in claim 7 wherein said resistor is applied to a flank face of said tool body.

9. A tool as defined in claim 7 wherein said resistor is embedded in a selected face of said tool.

10. A tool as defined in claim 1 wherein said resistor is applied to a flank face of said tool body.

11. A tool as defined in claim 10 wherein said resistor is a straight line resistor having one edge substantially parallel to said cutting edge defined by said flank face to which said resistor is applied.

12. A tool as defined in claim 10 wherein said resistor extends around a corner defined by a pair of adjacent flank faces of said tool.

13. A tool as defined in claim 10 wherein a conducting phase of said resistor is positioned adjacent to said flank face to which it is applied and said resistor is encapsulated in a protective coating.

14. A tool as defined in claim 13 wherein said resistor is positioned adjacent to said cutting edge in a position to be subject to wear when said edge wears a selected amount to reduce the conducting path of said resistor and thereby increase the resistance of said resistor to indicate wear at said cutting edge.

15. A tool as defined in claim 10 wherein said resistor is positioned adjacent to said cutting edge in a position to be subject to wear when said edge wears a selected amount to reduce the conducting path of said resistor and thereby increase the resistance of said resistor to indicate wear at said cutting edge.

16. A tool as defined in claim 1 wherein said resistor is embedded in a selected face of said tool.

17. A method of measuring the remaining wear life of a tool comprising applying a resistor, the resistance of which is permanently altered in proportion to the time at which said resistor is at elevated temperature and the elevated temperatures to which said resistor is subjected in thermal conducting relationship to said tool in a position adjacent a portion of a cutting edge of said tool to be monitored and measuring the resistance of said resistor to provide an indication of the thermal stress to which said portion of said cutting edge has been subjected to provide an indication of the remaining wear left in said portion of said cutting edge.

* * * * *